United States Patent Office 2,967,876
Patented Jan. 10, 1961

---

2,967,876

ORGANOFUNCTIONAL SILOXANES

Donald L. Bailey, Snyder, N.Y., assignor to Union Carbide Corporation, a corporation of New York No Drawing. Filed Dec. 17, 1957, Ser. No. 703,251

3 Claims. (Cl. 260—448.2)

This invention relates to novel organosilicon compounds. More particularly, the invention contemplates the provision of the specific organosilicon compounds (1) beta - carbomethoxyethyl - bis(trimethylsiloxy)methylsilane, (2) beta - acetoxyethyl-bis(trimethylsiloxy)methylsilane, and (3) gamma-acetoxypropyl-bis(trimethylsiloxy)methylsilane as represented by the following respective structural formulae:

(1)
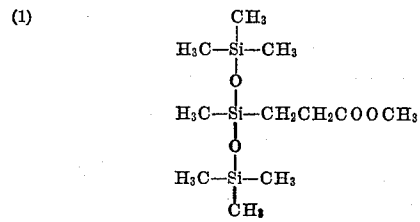

(2)
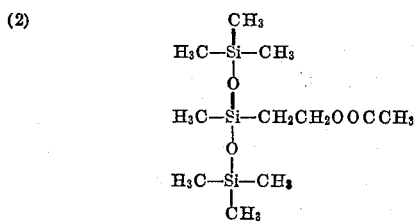

and
(3)
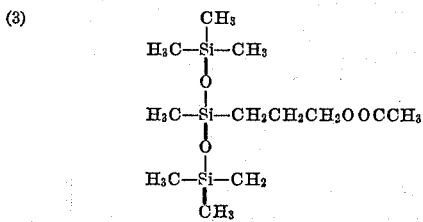

The invention is based on my discovery that the foregoing siloxane-ester structures can be synthesized by the thermal addition of heptamethyltrisiloxane

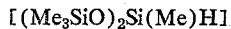

to the respective unsaturated organic esters methyl acrylate, vinyl acetate and allyl acetate in the presence of a platinum catalyst. In essence, the synthesis involves the formation of a reaction mixture comprising the heptamethyltrisiloxane, one of the unsaturated organic esters, and a small amount of a platinum catalyst, followed by heating of the reaction mixture to cause the components to react under influence of the platinum catalyst to effect decomposition of the silanic hydrogen bond of the siloxane and addition of the resulting silyl and hydrogen free radicals to respective carbon atoms of the carbon to carbon multiple bond of the unsaturated organic ester, with the production of the desired compound as an adduct of the component reactants.

The starting material heptamethyltrisiloxane employed in synthesizing the novel compounds of my invention may be produced by any one of several conventional procedures. Thus, it can be produced, for example, by the sulfuric acid catalyzed rearrangement of methylhydrogenpolysiloxane $[(MeSiHO)_x]$ with hexamethyldisiloxane $[Me_3SiOSiMe_3]$ as an endblocker. This equilibration may be accomplished by simply stirring the reactants at room temperature (25° C.) for a period of from four to eight hours in the presence of from 0.5 to 1 percent by weight of sulfuric acid, followed by suitable known measures for effecting catalyst removal.

The platinum catalyst used in promoting addition of the heptamethyltrisiloxane to the unsaturated organic esters, is preferably employed in finely-divided form, either alone, or in combination with an inert support such as charcoal, and the like, or in the form of a multi-component or heterogeneous catalyst consisting of platinum deposited on the gamma-allotrope of alumina (platinum-on-gamma-alumina).

It is found that the relative concentration of platinum employed for catalyzing the addition reactions is not overly critical, but rather, concentrations of the elemental metal ranging from 0.001 part to about 5 parts by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction are also relatively non-critical, and the reactions can be brought to completion with good yields of the adducts by heating the reactants at temperatures within the range 80–180° C. for periods ranging from about four to twelve hours. In actual practice, I prefer to operate at temperatures within the range 110–175° C. It is relatively essential however, to effect stirring or agitation of the reaction mixture throughout the time of treatment in order to establish and maintain uniform dispersion of the solid catalyst within the liquid reaction phase. This may be readily accomplished through the use of conventional reaction vessels of the types provided with automatic stirring equipment, or, an autoclave of the so-called "rocking" type can be employed to advantage.

It should be noted that in the addition reaction of heptamethyltrisloxane to allyl acetate in the presence of platinum at reflux temperatures, as represented by the equation:

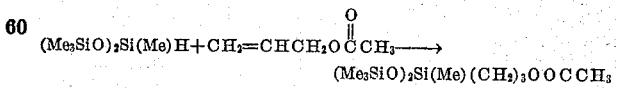

there is a tendency for side reactions to occur resulting in decreased yields of the desired adduct, gamma-acetoxypropyl-bis(trimethylsiloxy)methylsilane. Thus, the reaction yields propylene and the acetoxy derivative

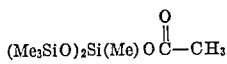

as well as the normal adduct. The foregoing product is probably formed as a result of decomposition of a portion of the normal adduct, presumably the alpha-isomer. The decomposition is illustrated by the following skeletal equations:

(a)

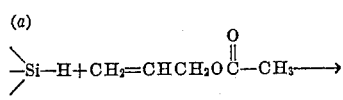

Alpha addition (unstable)

(b)

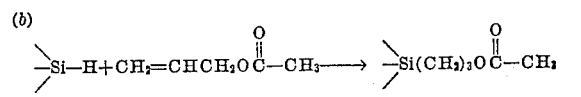

Beta addition (stable)

The presence of a polar group within the compounds of the invention render them extremely useful as modifiers for silicone materials such as oils and elastomers, as well as for thermosetting resins. Thus, the polar group makes the compounds useful for modifying silicone rubbers or thermosetting resins to contribute greater strength, greater cohesive and adhesive forces in bonding to other materials, greater solvent resistance, etc. In addition, the polar group permits utilization of the compounds to impart greater lubricity to silicone oils. The compounds, per se, are useful as silicon oils, and may be employed, also, to introduce the functional ester groups into siloxanes, in general, by conventional equilibration techniques.

The organic ester groups present within the compounds of the invention will react with other organic compounds or polymers and undergo all the conventional reactions of organic esters. For example, by ester exchange they may be incorporated into alkyd-type resins.

It is believed that the invention may be best understood by reference to the following specific examples describing the foregoing principles and procedures as applied to the production of the novel compounds of the invention:

EXAMPLE I

*Preparation of beta-carbomethoxyethyl-bis(trimethylsiloxy)methylsilane [(Me$_3$SiO)$_2$Si(Me)(CH$_2$)$_2$COOCH$_3$] by addition of bis(trimethylsiloxy)methylsilane to methyl acrylate*

Into a one liter flask equipped with stirrer, reflux condenser, and dropping funnel, were charged 111 grams (0.5 mole) of (Me$_3$SiO)$_2$SiMeH and 1.5 grams of one percent platinum-on-gamma-alumina catalyst. After heating the mixture to 140° C., 69 grams (0.8 mole) of CH$_2$=CHCOOCH$_3$ was added via the dropping funnel over a period of four hours. The resulting mixture was heated for an additional five hours at 140–150° C. The reaction mixture was then cooled to room temperature and centrifuged to remove the catalyst. Fractionation of the products yielded 39 grams (25 mole-percent yield) of (Me$_3$SiO)$_2$Si(Me)(CH$_2$)$_2$COOMe. The adduct yielded the following physical and analytical data:

Boiling point _____ 40–42° C./0.2 mm.
Refractive index ($n_D^{25}$) _____ 1.4046

| | Percent C | Percent Si | Percent H | Saponification Equivalent meq. per gram |
|---|---|---|---|---|
| Found | 41.2 | 27.2 | 8.9 | 3.1 |
| Theoretical | 42.8 | 27.2 | 9.1 | 3.2 |

EXAMPLE II

*Preparation of beta-acetoxyethyl-bis(trimethylsiloxy)methylsilane[(Me$_3$SiO)$_2$Si(Me)CH$_2$CH$_2$OOCCH$_3$] by addition of bis(trimethylsiloxy) methylsilane to vinyl acetate*

Into a 300 cubic centimeter steel bomb were charged 111 grams (0.5 mole) of heptamethyltrisiloxane, 34.4 grams (0.4 mole) of vinyl acetate, and 2.9 grams (2 wt.-percent) of two percent platinum-on-gamma-alumina. The vessel was rocked at 175° C. for a period of six hours. The contents of the bomb were removed and the catalyst separated by use of a centrifuge. Fractionation of the material yielded 79.0 grams (25.6% yield) of the desired adduct which had: boiling point 57–72° C./8.0 mm.; $n_D^{25}$=1.3902–1.3929. After redistillation, the following physical and analytical data were obtained with the adduct:

Boiling point _____ 72° C./8.0 mm.
Refractive index ($n_D^{25}$) _____ 1.3919

| | Percent C | Percent Si | Percent H | Saponification Number |
|---|---|---|---|---|
| Found | 39.2 | 28.5 | 10.3 | 199 |
| Theoretical (C$_{11}$H$_{28}$O$_4$Si$_3$) | 42.8 | 27.3 | 9.9 | 182 |

EXAMPLE III

*Preparation of gamma-acetoxypropyl-bis(trimethylsiloxy)methylsilane[(Me$_3$SiO)$_2$Si(Me)(CH$_2$)$_3$OOCCH$_3$] by addition of heptamethyltrisiloxane to allyl acetate*

Into a 500 cubic centimeter, three-necked flask equipped with stirrer, reflux condenser and thermometer, there were charged 70 grams (0.7 mole) of allyl acetate, 66 grams (0.3 mole) of heptamethyltrisiloxane, and 1 gram of one percent platinum-on-gamma-alumina catalyst. The mixture was heated from 110–150° C. with stirring for twelve (12) hours. After this period of heating, a total of 7 cubic centimeters of liquefied gas collected from the reaction in a trap was cooled in an acetone-Dry Ice bath. The boiling point of this condensible gas was −48 to −46° C. (propylene boiling point=−46° C.). The flask and its contents were cooled to room temperature and the liquid products were filtered to remove the catalyst. Upon rectification of the products, there were obtained 31 grams of low boilers, 21 grams of,

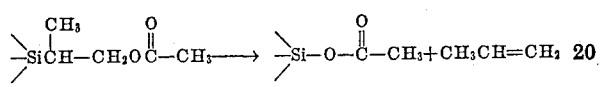

(B.P. 38–40° C./0.8 mm. Hg; $n_D^{25}$=1.3910); and 51.5 grams of the adduct, (Me$_3$SiO)$_2$Si(Me)(CH$_2$)$_3$OOC–CH$_3$ (B.P. 67–70° C./0.8 mm. Hg; $n_D^{25}$=1.4098); saponification equiv. 3.1 meq./g.—theory—3.1 meq./g); and 5.5 grams of residues. Analysis of the desired adduct yielded the following data:

| | Percent C | Percent Si | Percent H |
|---|---|---|---|
| Found | 44.3 | 25.2 | 9.4 |
| Theoretical | 44.7 | 26.0 | 9.3 |

Having thus described the subject matter of my invention, what it is desired to secure by Letters Patent is:

1. An organofunctional siloxane selected from the group of siloxanes represented by the formula:

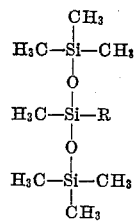

wherein R represents a member selected from the group consisting of, beta-acetoxyethyl, and gamma-acetoxypropyl radicals.

2. Beta - acetoxyethyl - bis(trimethylsiloxy)methylsilane.

3. Gamma-acetoxypropyl-bis(trimethylsiloxy)methylsilane.

References Cited in the file of this patent

UNITED STATES PATENTS

| 2,723,987 | Speier | Nov. 15, 1955 |
| 2,823,218 | Speier et al. | Feb. 11, 1958 |
| 2,872,434 | Barnes | Feb. 3, 1959 |

FOREIGN PATENTS

| 1,117,542 | France | Feb. 27, 1956 |
| 1,153,312 | France | Sept. 30, 1957 |

OTHER REFERENCES

Speier et al.: "Jour. Am. Chem. Soc.," vol. 79 (February 20, 1957), pp. 974–9.